July 4, 1961 J. McEWAN 2,990,654
LAWN MOWER SHARPENER
Filed May 9, 1960 3 Sheets-Sheet 1
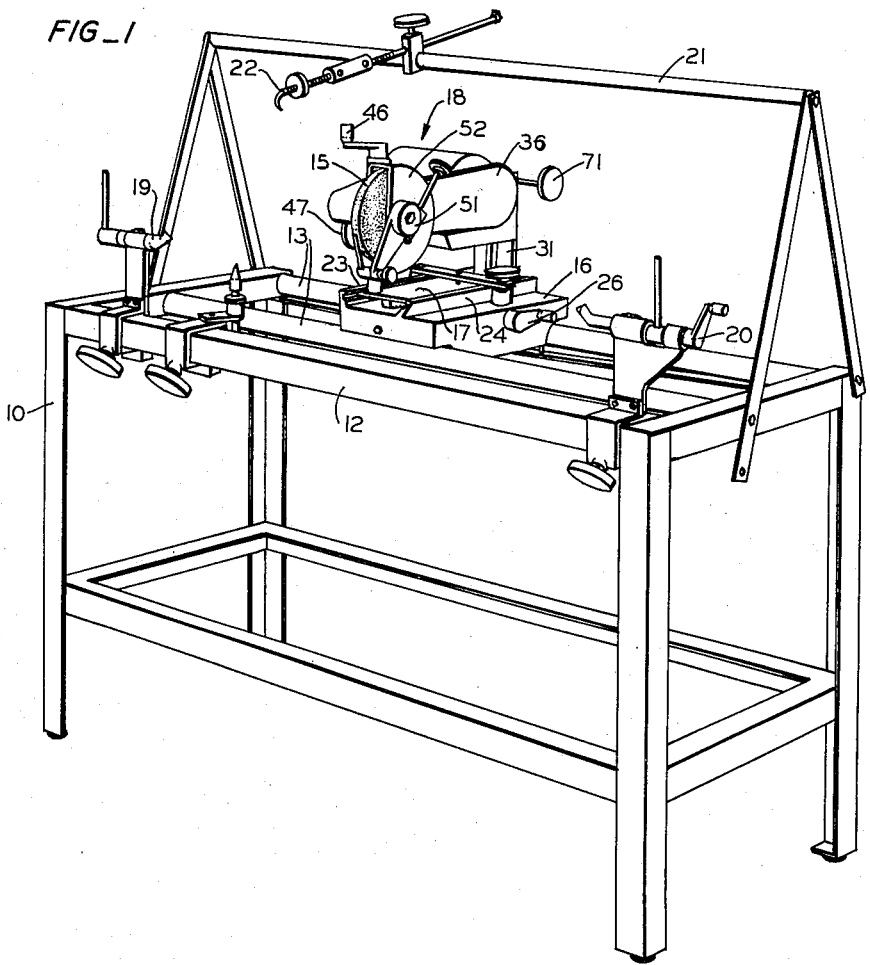
FIG_1
*INVENTOR.*
*JAMES McEWAN*
BY
*Allen and Chromy*
ATTORNEYS

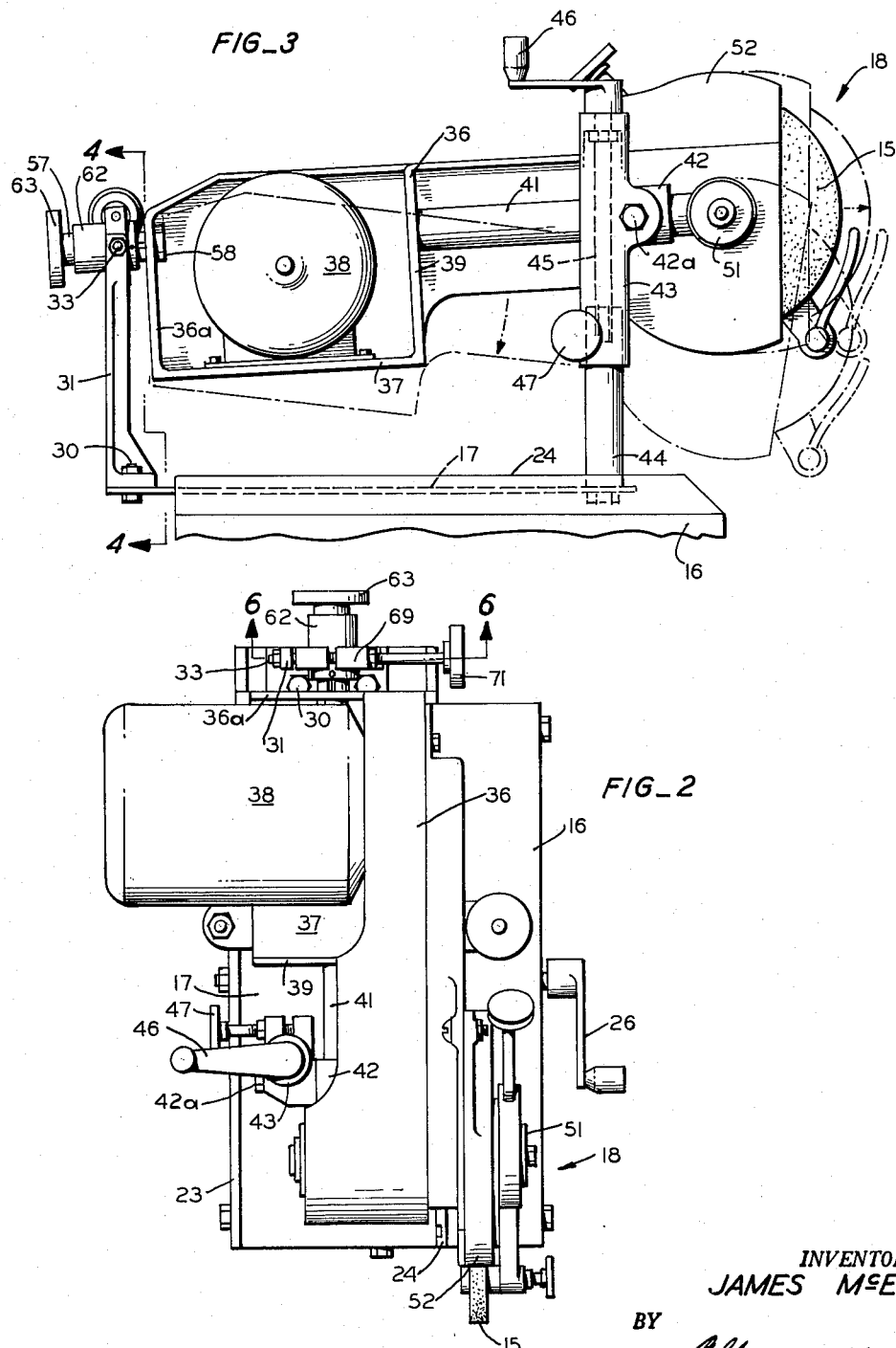

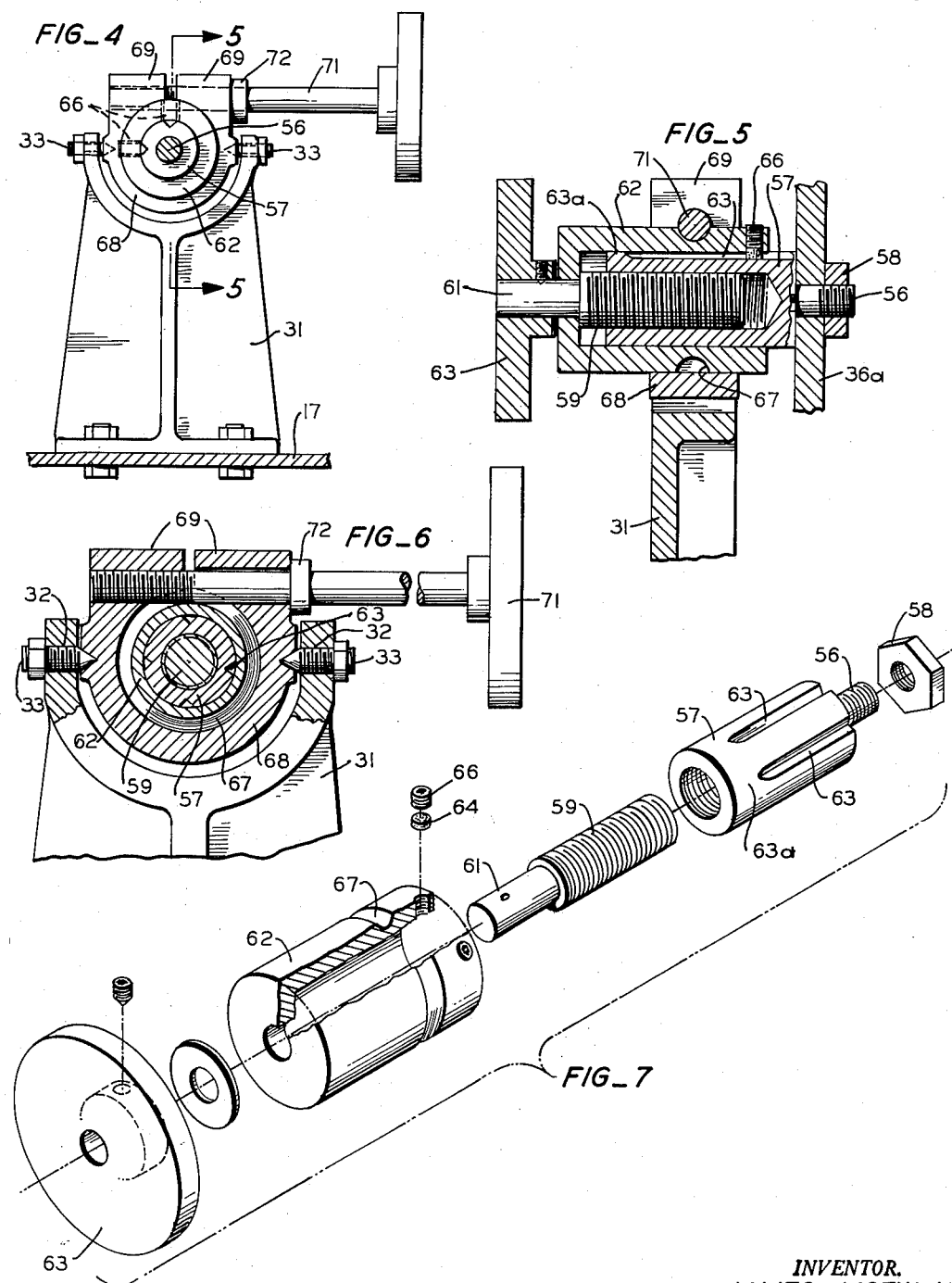

** 2,990,654
LAWN MOWER SHARPENER
James McEwan, 1690 Shasta Ave., San Jose, Calif.
Filed May 9, 1960, Ser. No. 27,832
7 Claims. (Cl. 51—48)

The present invention relates to lawn mower sharpeners, and is concerned more particularly with an improved sharpener which provides an effective sharpening action with ease of operation for the operator.

It is a general object of the invention to provide a lawn mower sharpener which can be used to sharpen both the reel blades and the bed knife easily and accurately.

A further object of the invention is to provide a lawn mower sharpener of the above character employing a grinding head which is mounted for placing of the grinding wheel in a vertical position or horizontal position as desired in the sharpening operation.

Still another object of the invention is to provide a lawn mower sharpener in which the grinding wheel is carried adjustably on a carriage, and the carriage is mounted in a desirable fashion to provide for both coarse and fine in-and-out adjustment of the wheel.

Other objects and advantages of the invention will be apparent from the following description of a preferred embodiment thereof, as illustrated in the accompanying drawing, in which:

FIGURE 1 is a perspective view of the lawn mower sharpener;

FIGURE 2 is a plan view of the grinding head;

FIGURE 3 is a side elevational view of the grinding head shown in vertical position and its carriage, as viewed from the left in FIGURE 2;

FIGURE 4 is a detail sectional view taken in a plane of the line 4—4 in FIGURE 3;

FIGURE 5 is a fragmentary detail enlarged view taken in a plane as indicated by the line 5—5 in FIG. 4;

FIGURE 6 is a detail sectional view taken in a plane indicated by the line 6—6 in FIGURE 2.

FIGURE 7 is a perspective exploded view of the fine adjustment means for the grinding wheel.

Referring to FIGURE 1, the mower sharpener includes a rectangular frame 10 of welded construction having a front rectangular cross bar 12, and rearwardly of the front cross bar 12 there are a pair of cylindrical cross bars 13. The cross bars 13 carry for transverse sliding movement thereon a carriage 16 upon which is mounted a slide plate 17 which carries for adjustment thereon a grinding head 18 including a grinding wheel 15. The front square bar 12 has adjustably mounted thereon a head stock 20, and a tail stock 19 described in detail. The frame also carries an A-frame structure 21 adjustably mounted thereon and carrying a hook 22 forming part of the three-point mounting for the reel of the mower. The above parts are described in my copending application Serial No. 784,782, filed January 2, 1959.

The carriage 16 (FIGS. 1–3) provides a mounting for the grinding head 18 and its grinding wheel 15 and is mounted for sliding movement by suitable rollers on the cylindrical cross bars 13. Referring to FIGURE 1, the carriage 16 has a pair of upstanding walls or flanges 23 and 24, in which suitable milled grooves or guideways are provided to receive the slide plate 17 which is mounted for adjustable movement therein and controlled by an adjusting crank 26 by means of which the carriage can move back and forth in its guideways.

The slide plate 17 (FIGS. 2, 3 and 4) provides a mounting for the grinding head 18 and for this purpose has secured at its rear end by bolts 30 a bracket 31 which is forked at its upper end to provide horizontally aligned tapped bosses 32 for respective tapered pivot screws 33 for the grinding head 18 as later described in detail. The grinding head frame 36 (FIGS. 2 and 3) has a mounting flange 37 for a motor 38 secured thereto. At the front of the motor mounting flange 37 there is a transverse wall 39 carrying a shaft 41 extending parallel to the length of the grinding head frame 36 and mounted adjacent its front end in a swivel sleeve 42 pivotally mounted by pin 42a in an upright sleeve 43. The shaft 41 is secured at its front end in the frame casting 36.

The sleeve 43 (FIGURES 2 and 3) is slidably mounted on an upright post 44 secured to the slide plate 17 at its lower end and having a reduced internally threaded upper end engaged by an adjusting screw 45. The upper end of the screw 45 carries an operating handle 46 and is journaled in a boss of the sleeve 43. By rotation of the handle or crank 46, the front end of the grinding head frame can be raised and lowered about the pivotal mounting screws 35. A clamp screw 47 is threaded in the split lower end of sleeve 43 to lock it in adjusted position.

Adjacent its front end the grinding head frame 36 (FIGS. 1 and 2) has a boss 51 which provides the mounting for a shaft carrying the grinding wheel 15 adjacent one end thereof within a guard 52. The grinding wheel 15 is connected by suitable means to the motor 38.

The grinding head can be run in and out with respect to the front of the machine by movement of the slide plate 17 in its guide ways, and it can be clamped in a selected position by suitable means.

Referring to FIGS. 4 through 7, the rear wall 36a of the grinding head frame 36 is apertured to receive a threaded stud extension 56 of an internally tapped sleeve 57 which is secured to the grinding head frame by a nut 58. This tapped sleeve 57 is engaged by an adjusting screw 59 having a reduced end 61 which is journaled in a mounting sleeve 62, and has a hand wheel 63 secured thereon. The respective sleeves 57 and 62 are connected for relative sliding movement by means including a plurality of milled grooves 63 in the outer surface of the sleeve 57, each of which is engaged by a pressure disc 64 of nylon which is held in firm engagement with the groove 63 by a backing set screw 66 threaded in the outer sleeve 62. The outer sleeve 62 is provided with an annular groove 67 and is journaled in a split clamping member 68, having respective bosses 69 engaged by a clamping screw 71 and an annular shoulder 72.

It will be seen, therefore, that the sleeves 57 and 62, are mounted for telescoping adjusting movement with respect to each other, under control of the screw 59 and the limit of this movement in one direction of travel is provided by the shallow ends 63a of the groove 63 and the pressure discs 64.

By loosening the clamping screw 71, the grinding head frame 36 and the sleeves 62 and 57 can be rotated within the clamp 68, the axis of this rotative adjustment being aligned with the axis of the shaft 61 and the rotative adjustment of the grinding head about the axes of these shafts provides for adjustment of the grinding head between horizontal and vertical positions. At the same time the position of the grinding head as far as in and out adjustment is concerned can be positioned accurately by the fine adjustment means provided by the sleeves 57 and 62, and the screw 59.

It will be seen that the grinding head has a point of universal adjustment at the intersection of the axes of the pivot screws 33 and the shaft 56, as well as an in-and-out adjustment with respect to the support bracket.

While I have shown and described a preferred embodiment of the invention, it will be apparent that the invention is capable of variation and modification from the form shown so that the scope thereof should be limited only by the scope of the claims appended hereto.

I claim:

1. In a lawn mower sharpener, a frame, a carriage mounted on the frame for sliding movement therealong in a direction transverse to said frame, a grinding head mounted on the carriage for movement therewith in the transverse movement of the carriage and for adjusting movement vertically with respect to the carriage and for in-and-out movement with respect to the carriage, a grinding wheel carried by said head for positioning with respect to a mower part to be sharpened, a support on the carriage for the grinding head, means connecting the forward end of the grinding head to said support, and means providing universal mounting for the rear end of the grinding head comprising an upright bracket on said support, a mounting member pivotally supported about a horizontal transverse axis in said upright bracket and pivotally connected to said grinding head about a horizontal longitudinal axis intersecting said transverse axis, and adjusting means connected to said mounting member for controlling in-and-out adjustment of said grinding head.

2. In a lawn mower sharpener, a frame, a carriage mounted on the frame for sliding movement therealong in a direction transverse to said frame, a grinding head mounted on the carriage for movement therewith in the transverse movement of the carriage and for adjusting movement vertically with respect to the carriage and for in-and-out movement with respect to the carriage, a grinding wheel carried by said head for positioning with respect to a mower part to be sharpened, a slidable support plate on the carriage for the grinding head, means connecting the forward end of the grinding head to said support plate, and means providing universal mounting on said support plate for the rear end of the grinding head, a mounting member pivotally supported about a horizontal transverse axis in said mounting means and pivotally connected to said grinding head about a horizontal longitudinal axis intersecting said transverse axis and adjusting means connected to said mounting member for controlling in-and-out adjustment of said grinding head with respect to said slide plate.

3. In a lawn mower sharpener, a frame, a grinding head mounted on the frame for movement in a transverse direction and for adjusting movement vertically with respect to the frame and for in-and-out movement with respect to the frame, a grinding wheel carried by said head for positioning with respect to a mower to be sharpened, a support on the frame for the grinding head, means connecting the forward end of the grinding head to said support, and means providing universal mounting for the rear end of the grinding head comprising an upright bracket on said support, a mounting member pivotally supported about a horizontal transverse axis in said upright bracket and pivotally connected to said grinding head about a horizontal longitudinal axis intersecting said transverse axis, and adjusting means connected to said mounting member for controlling in-and-out adjustment of said grinding head.

4. In a lawn mower sharpener, a frame, a grinding head mounted on the frame for movement in a transverse direction and for adjusting movement vertically with respect to the frame and for in-and-out movement with respect to the frame, a grinding wheel carried by said head for positioning with respect to a mower to be sharpened, a support on the frame for the grinding head, means connecting the forward end of the grinding head to said support, mounting means for the rear end of the grinding head, a mounting member pivotally supported about a horizontal transverse axis in said mounting means and pivotally connected to said grinding head about a horizontal longitudinal axis intersecting said transverse axis, and adjusting means connected to said mounting member for controlling in-and-out adjustment of said grinding head.

5. In a lawn mower sharpener as recited in claim 4 in which said universal mounting means includes a pair of telescopically non-rotatably engaged elements, the inner of said elements having internal threads, and an adjusting screw rotatably connected to the outer of said elements and having threaded engagement with said inner element for effecting a fine in-and-out adjustment of the grinding head.

6. In a lawn mower sharpener as recited in claim 4 in which said universal mounting means includes a pair of telescopically non-rotatably engaged elements, the inner of said elements having internal threads, and an adjusting screw rotatably connected to the outer of said elements and having threaded engagement with said inner element for effecting a fine in-and-out adjustment of the grinding head, said telescopic and non-rotatable engagement being provided by a longitudinal groove in one of said elements and pressure means in the other of said elements engaging said groove to provide both a key and a brake.

7. In a lawn mower sharpener as recited in claim 6 in which said groove terminates at one end wall forming a stop for said pressure means.

References Cited in the file of this patent

UNITED STATES PATENTS

| | | |
|---|---|---|
| 2,180,911 | Rogers | Nov. 21, 1939 |
| 2,377,126 | Brown | May 29, 1945 |
| 2,466,905 | Machovec | Apr. 12, 1949 |